United States Patent [19]
Nelson et al.

[11] 3,873,753
[45] Mar. 25, 1975

[54] METHOD FOR PROCESSING AND STORING TOMATOES

[75] Inventors: Philip E. Nelson; Glenn H, Sullivan, both of West Lafayette, Ind.

[73] Assignee: Purdue Research Foundation, Lafayette, Ind.

[22] Filed: Apr. 14, 1972

[21] Appl. No.: 244,100

Related U.S. Application Data

[63] Continuation-in-part of Ser. No. 40,549, May 26, 1970, abandoned.

[52] U.S. Cl. ............... 426/373, 426/400, 426/418, 426/384, 426/506, 426/518, 426/521, 426/524, 99/483, 99/484, 99/538
[51] Int. Cl. ............................................. A23b 7/00
[58] Field of Search ............................ 99/154–156, 99/105, 100 R, 103, 186, 215–216, 483, 484, 538; 426/372, 373, 400, 418, 484, 506, 518, 521, 524

[56] References Cited
UNITED STATES PATENTS

| | | | |
|---|---|---|---|
| 1,978,078 | 10/1934 | Eberts | 99/105 X |
| 2,169,367 | 8/1939 | Mills | 99/155 |
| 2,368,945 | 2/1945 | Peebles | 99/186 X |
| 3,036,921 | 5/1962 | Rietz | 99/105 |
| 3,230,095 | 1/1966 | Stewart, Jr. | 99/186 X |
| 3,297,448 | 1/1967 | Smith et al. | 99/186 X |
| 3,310,410 | 3/1967 | Lang et al. | 99/155 X |
| 3,366,490 | 1/1968 | Wagner et al | 99/105 |

Primary Examiner—A. Louis Monacell
Assistant Examiner—Martin G. Mullen
Attorney, Agent, or Firm—Wood, Herron & Evans

[57] ABSTRACT

Disclosed herein is a process for making and aseptically storing a single strength or concentrated crushed tomato product. The tomatoes are washed and chopped, cooled to about 40°F., heated to 190°–200° F., deaerated, heated to about 250° F. for about 42 seconds, cooled to about ambient temperature, and then stored under aseptic conditions. In the preferred process the heating and cooling steps are carried out in a heat exchanger so that the heat necessary to heat the 40° F. product to 190°–200° F. is provided by the product previously heated to 250° F. The product heated to 250° F. is thereby cooled to 100° F.

In a modification of the process when a concentrated product is to be stored, the tomatoes are washed, chopped, cooled, and heated to 190°–200° F. and are thereafter finished and a portion of the liquid evaporated. Thereafter the product is heated to kill the microorganism *Bacillus Coagulans* and then cooled to about ambient temperature and stored.

In a further modification of the process, the tomatoes are washed, chopped, cooled, initially heated to 190°–200° F., then subjected to finishing and evaporating operations to form a concentrated product which is packaged without further storage.

30 Claims, 5 Drawing Figures

METHOD FOR PROCESSING AND STORING TOMATOES

BACKGROUND OF THE INVENTION

This application is a continuation-in-part of the pending application of Philip E. Nelson and Glenn H. Sullivan for "Method for Processing and Storing Tomatoes," Ser. No. 40,549, filed May 26, 1970, now abandoned.

The United States is the world's largest grower and processor of tomatoes. Over six million tons of tomatoes are grown annually for processing into tomato products for subsequent sale. The tomatoes grown in a particular geographic region are harvested during a relatively brief period of time. Improved varieties of tomato plants have been developed so that the tomatoes ripen at about the same time.

After harvesting, the tomatoes must be quickly processed, so as to avoid spoilage, into the desired end products, some of which are tomato juice, tomato puree, tomato sauce and canned tomatoes. This need for quick processing creates a number of problems. For instance, the tomato processor must decide what tomato products he will produce. This, of course, is not an easy decision for such factors as future demand and present supply must be considered. Secondly, the processor must be prepared to supply the requisite seasonal labor. Also, he must insure that he has on hand the proper supplies including the requisite number and type of bottles, jars and cans. Not only must sufficient supplies be on hand, but the facility must have the capacity necessary to process the tomatoes. Of course, if processing could be effected over a longer period, the size of the processing facility could be reduced. The processor must also be prepared to store or distribute the products produced. Again, if the processing could be spread out over a longer period of time, storage facilities could be reduced.

Attempts have been made in the past to store tomatoes for future processing and to thereby eliminate the aforementioned problems. Most of such attempts have been directed to providing a storable concentrated tomato product. Many of such attempts have, for one reason or another, been completely unsuccessful. While some may have been successful to a degree, their utility is still inherently diminished by the fact that the concentrated product can only be processed into a limited number of end products.

To our knowledge there is no commercially practical process available today wherein a single strength, crushed tomato product, i.e., crushed tomatoes and their juices in unconcentrated form, can be economically sterilized and stored in bulk for a long period of time without spoiling or seriously deteriorating and which can thereafter be processed into any desired tomator end product. Therefore, there exists today a real need for a process for producing and storing a single strength product which can be utilized by small and large tomato processors alike.

Conventional methods for processing tomatoes for juices, catsup, etc. include a sterilization step. In manufacturing juice it is customary to heat the juice to a temperature of about 260° F. and hold it there for about 1 minute or less. This destroys the enzymes and microorganisms that would otherwise harm the juice. The source of heat the processors frequently use is steam. After sterilization, the product must be cooled before storage since if it is not, deterioration results. Water is frequently utilized as the cooling medium. Unfortunately, many smaller processors do not have at their disposal a supply of water large enough for both heating and cooling.

SUMMARY OF THE INVENTION

We have now discovered a method for economically and efficiently sterilizing tomatoes so that a crushed, single strength or concentrated tomato product is produced. We have also discovered a method whereby that sterilized product may be stored under substantially ambient temperature conditions for a substantial period of time, for example, several months to a year. Through the use of our process the single strength or concentrated product may be stored for an appreciable period of time and then can be processed into any one of a number of end products. Various end products may be processed throughout the year according to market demand. By being able to spread out the processing over a longer period of time, seasonal labor problems are almost eliminated. It is possible also to reduce the size of the processing facilities since, while the total amount processed during any given year remains the same, the processing may be spread out over the entire year.

It has also been an important objective of our invention to provide a process for producing a final end product which has a better consistency than heretofore obtainable. In the production to tomato products, such as tomato catsup and tomato juice, one of the properties of the product which determines its grade, as for example U.S Grade A or U.S. Grade C, is its consistency. By consistency is meant the viscosity of the product. Current standards for determining whether tomato catsup has a good consistency may be found in a United States Department of Agriculture bulletin published at 7 C.F.R. Section 52,683. Similar standards for tomato juice are also published by the United States Department of Agriculture.

We have found quite unexpectedly that the consistency of our end product may be substantially increased by cooling the chopped tomatoes to below 50° F. before the product is sterilized. In one series of tests, tomatoes extracted at about 70° F. and thereafter sterilized were found to have a viscosity of about 400 centipoises. In contrast, tomatoes of the same variety extracted and cooled to about 40° F. and then sterilized resulted in the production of a product having a viscosity of about 575 centipoises.

In some cases it is advisable to employ a variation of our preferred method to take advantage of this consistency increase even when the product is not aseptically stored, but rather is directly filled into containers as a concentrated product, for example, catsup. In this modified process, the tomatoes are washed, chopped, and then cooled to below 50° F., and are preferably held at this temperature for a period of several minutes. Thereafter, the product is "commercially" sterilized by heating to 190° F. as explained above. Following this heating process, the product is evaporated to concentrate it to a higher solids content, any desired additives, such as vinegar and spice for example, are added, and the seeds and skin are removed to constitute a final product, such as catsup. This final product is then directly filled into the bottles, cans, or other containers.

While this modified process does not utilize the advantages of aseptic storage, it nevertheless provides very substantial advantages in terms of economy of product preparation. For example, it has been determined that when catsup is produced utilizing tomatoes processed in accordance with the present invention as described above, substantially less, i.e., 10–30 percent less, tomatoes are required to make catsup identical to that made from conventionally processed tomatoes.

It has been another important objective of our invention to provide a process which efficiently utilizes energy available from the process to heat and cool the crushed tomato product. The objective of such efficient energy utilization has been to provide a process which can be economically practiced by processors which do not have a large source of steam and water. This objective has been accomplished by providing a process wherein the crushed tomato product is (1) initially cooled to about 40° F., (2) then heated to about 190° F., (3) then heated to about 250° F., and (4) then cooled to about 100° F. or below prior to storing it. The heat required to heat the 40° F. product to 190° F. is provided by the product previously heated to 250° F. The cooling energy required to cool the 250° F. product to 100° F. is supplied by the 40° F. product. It can thus be seen that our process efficiently utilizes the inherent sources of heating and cooling.

DETAILED DESCRIPTION OF THE INVENTION

Having thus described in a general manner our process and the advantages obtainable therefrom, we shall now disclose it in more particularity in connection with several examples illustrating a preferred form of process and modifications thereof. In this connection, reference will be made to the drawings, in which:

The first step of our process consists of washing the tomatoes. Since our ultimate goal is an aseptic product, it is important to wash them thoroughly. Thereafter, the tomatoes are chopped into pieces. While the size of the screen used in chopping can vary, we have found that ⅜ inch pieces are especially adapted for further processing according to our invention.

After chopping, the pieces, pulp, and juice are quickly cooled to about 40° F. The cooling to about 40° F. should be effected as quickly as possible, optimally in 10 seconds or less; but in practice this may require as long as one minute. The initial cooling step serves several important purposes. Firstly, it greatly reduces the activity of certain enzymes which destroy the pectin in the juice. Secondly, it serves to control the viscosity of the final product.

While we prefer to cool the tomatoes to about 40° F., a temperature slightly above 40° F. will still produce these results. Those skilled in the art will recognize that the enzyme activity is directly related to temperature, namely, that for every 10° increase in temperature (°C) the rate of enzyme activity doubles. Hence, it is desirable to cool the product to around 40° F.

As previously pointed out, we have unexpectedly found and demonstrated that the viscosity of the final single strength, crushed tomato product may be very substantially increased by initially cooling the product to about 40°–50° F. A series of tests demonstrating this phenomenon will now be described.

For the purpose of the tests a quantity of tomatoes of unknown variety were obtained. The tomatoes were washed and extracted, i.e., chopped, at various temperatures and held at those temperatures for various periods of time. The tomatoes were then heated from that temperature to about 190° F. Thereafter, they were cooled to approximately 100° F. The cooled product was then placed in cans, two drops of Dow Anti-Foam Number 72 per each can. The cans were then heated to a temperature of about 190° F. and sealed. The canned product was refrigerated and then the viscosity measured at 27° C. The apparent viscosity was measured with a Brookfield viscometer using a number 3 spindle rotating at 20 rpm. The sample was stirred completely and then the disk was rotated for 15 seconds, before a reading was taken. This procedure was replicated four times and an average reading was taken for the sample.

The results of these tests are recorded in the following table. The results show quite graphically that there is a marked increase in the viscosity of the resultant product as a result of the initial cooling step. It will be noted that the tests show that at an extraction temperature of about 70° F. the resultant viscosity of the final product was found to average about 400 centipoises. An initial cooling step to about 53° F. produced final products having an average viscosity of about 427 centipoises. This increase is negligible. However, employing an initial cooling step wherein the product is cooled to about 40° produces final products having an average viscosity of about 576. This is a very substantial increase in viscosity. Other tests on another variety of tomatoes have substantiated this significant increase in viscosity.

TABLE

| SAMPLE NO. | °F. — TEMP. OF EXTRACTION | HOLDING TIME — MIN. | APPARENT VISCOSITY CENTIPOISES | AVERAGE APP. VISC. FOR TIME | AVERAGE APP. VISC. FOR TEMP. |
|---|---|---|---|---|---|
| 1 | 85° | 3 | 246 | 251 | 227 |
| 2 | 85° | 3 | 256 | 251 | 227 |
| 3 | 85° | 10 | 214 | 193 | 227 |
| 4 | 85° | 10 | 172 | 193 | 227 |
| 5 | 85° | 25 | 245 | 235 | 227 |
| 6 | 85° | 25 | 225 | 235 | 227 |
| 7 | 71° | 3 | 372 | 386 | 400 |
| 8 | 71° | 3 | 399 | 386 | 400 |
| 9 | 71° | 10 | 386 | 407 | 400 |
| 10 | 71° | 10 | 428 | 407 | 400 |
| 11 | 71° | 25 | 442 | 408 | 400 |

TABLE—Continued

| SAMPLE NO. | °F. — TEMP. OF EXTRACTION | HOLDING TIME — MIN. | APPARENT VISCOSITY CENTIPOISES | AVERAGE APP. VISC. FOR TIME | AVERAGE APP. VISC. FOR TEMP. |
| --- | --- | --- | --- | --- | --- |
| 12 | 71° | 25 | 373 | 408 | 400 |
| 13 | 41° | 3 | 562 | 595 | 576 |
| 14 | 41° | 3 | 627 | 595 | 576 |
| 15 | 41° | 10 | 600 | 557 | 576 |
| 16 | 41° | 10 | 515 | 557 | 576 |
| 17 | 53° | 3 | 494 | 456 | 427 |
| 18 | 53° | 3 | 419 | 456 | 427 |
| 19 | 53° | 10 | 320 | 340 | 427 |
| 20 | 53° | 10 | 336 | 340 | 427 |
| 21 | 53° | 25 | 515 | 486 | 427 |
| 22 | 53° | 25 | 456 | 486 | 427 |

After cooling to about 40° F., the product is heated to a temperature of between 190° F. and 200° F. The heat-up time should be as short as possible from 10 seconds to one minute. It has been found that the product should not be held at that temperature for a prolonged period of time. We have found that a desirable holding time at this temperature is about 1–5 minutes.

Next, the product is deaerated. We are, of course, aware that processes have been proposed in the past for deaerating vegetables including tomatoes. Those skilled in the art are familiar with the type of equipment which can be employed for this purpose and we do not deem it necessary to describe in particularity such equipment. Suffice it to say that the deaeration step is effected in a suitable chamber under a vacuum of from 3 to 5 inches of mercury. The temperature during such a step is slightly less than 190°. In addition to deaerating the product, the deaerating chamber serves another function, namely, that of a reservoir for the single strength product. By maintaining the level in the deaerating chamber, momentary surges, etc. in the process are eliminated. At this point hydrochloric acid or other acids, such as citric acid, can optionally be added in an amount sufficient to provide a pH of about 2. U.S. Pat. No. 3,366,488 discusses the advantages to be obtained from adding the acid, namely, an increase in consistency and yield. If desired, the acid could be added during the chopping of the tomatoes or at a later step in the process. If acid is added, it will, of course, have to be neutralized and sodium hydroxide can be used for that purpose. Such neutralization of the acid will produce water and sodium chloride, neither of which is objectionable in the final product.

After the deaerating, the product is quickly heated to 250° F. and held there for 7/10 of a minute. The purpose of this heating step is to destroy the heat tolerant microorganism *Bacillus Coagulans*.

While the above represents a preferable combination of time and temperature, as is well known to those skilled in the art, there is a range of equivalent times and temperatures effective to destroy *Bacillus Coagulans*. Thus, any of the following heating equivalents could be employed:

| Temperature | Holding Time |
| --- | --- |
| 245° F. | 1.5 min. |
| 250° F. | .7 min. (42 seconds) |
| 255° F. | .32 min. (19.2 seconds) |
| 260° F. | .15 min. (9.0 seconds) |
| 265° F. | .07 min. (4.2 seconds) |

After the heating step, the product is cooled to below about 110° F. and preferably to about ambient temperature.

By the aforedescribed process we have produced a completely sterile single strength tomato product, ready to be stored. It is extremely important that this product be handled thereafter in an aseptic manner or else the product will deteriorate rapidly and will not be suitable for later conversion into the desired final products.

Before describing how we aseptically store our sterilized tomato product, we would like to point out one advantage of our sterilizing process as compared to a conventional one. As previously mentioned, one very significant advantage of our process is that it enables its user to accomplish the heretofore mentioned objectives of processing and storing tomatoes with a minimum of heat and water. This is due to the manner in which our system is heat balanced, that is, the way in which we utilize the heat available from the product during processing. This desirable feature will now be discussed.

In the heating of the product from 40° to about 190° F. as previously described, we utilize as the source of heat the product which has been heated to 250° F. in a later step of the process. In other words, we use the product previously heated to 250° F. to heat the 40° F. product to 190° F. Such a utilization of heat is desirable for several reasons. Firstly, the product heated to 250° must be cooled to below 110° F., and preferably to ambient temperature before it can be stored. Hence, by this procedure we are able to reduce the amount of cooling energy that must be supplied. Secondly, by utilizing the heating capacity of the product heated to 250° F. to heat the cool 40° product to 190° F. a significant amount of heat that would otherwise be required to be supplied is eliminated.

We have found that, as compared to a process wherein the initial chopped product is not cooled but is heated directly to 250° and held for 42 seconds, significant savings in heating and cooling energies can be obtained through the use of our process. In this latter type of process it would take about 7,200 pounds of stream per hour to heat 20 tons of single strength tomato juice to 250° and to hold it at that temperature for 42 seconds. It would take between 10,000 and 60,000 gallons of cooling water per hour to cool the product so heated to 250° to ambient temperature. The 10,000 gallons represents the amount required if the cooling water was permitted to become as hot as possible, whereas the 60,000 gallons of water represents the amount of cooling water required if that water was only permitted to reach a temperature of about 90° F. In contrast, our process utilizes only about 2,400 pounds of steam per hour to heat the product and hold it at 250° F.

In order to cool the product to ambient temperature, we employ only 2,000 to 10,000 gallons of water per hour, the maximum and minimum amounts again dependent upon whether the cooling water is allowed to become as hot as possible. It can thus be seen that by utilizing our process a processor cuts down very substantially on the amount of water and steam that is required. In fact, many processors could not, as a practical mater, employ a process requiring 7,200 pounds of steam per hour and 60,000 gallons of water per hour. Such amounts are available only to the larger processors.

While those skilled in the art will recognize that the heating and cooling of the product as required in our process can be accomplished with many different kinds of heat exchangers, one type which can be utilized is a "TRIPLE TUBE" heat exchanger. It is manufactured by Sanitary Processing Equipment Corporation The DeLaval Separator Company. This heat exchanger is made from stainless steel and consists of an inner tube, an intermediate tube and an outer tube, concentrically mounted. In its use in our process, the product to be heated or cooled travels in the following manner. In the initial cooling step the tomato product is passed in one direction through the intermediate tube. Any suitable pump may be employed. Flowing through the inner and outer tubes in the opposite direction is cold water. In the next step of the process wherein the product is heated to about 190° F. the cool 40° product is in the inner and outer tubes. Flowing in opposite direction in the intermediate tube is the product which has been heated in a later step of the process to 250° F. Next, the 190° product, still flowing in the intermediate tube, is heated to 250° F. by superheated water flowing in the opposite direction in the inner and outer tubes. After the product has been maintained at 250° F. for 7/10 of a minute in the intermediate tube, it is used to heat the 40° product to 190° F. Thereafter, it is cooled while still flowing into the tube to ambient temperature by cool water flowing in the opposite direction in tubes 1 and 3.

Figures 1, 2:
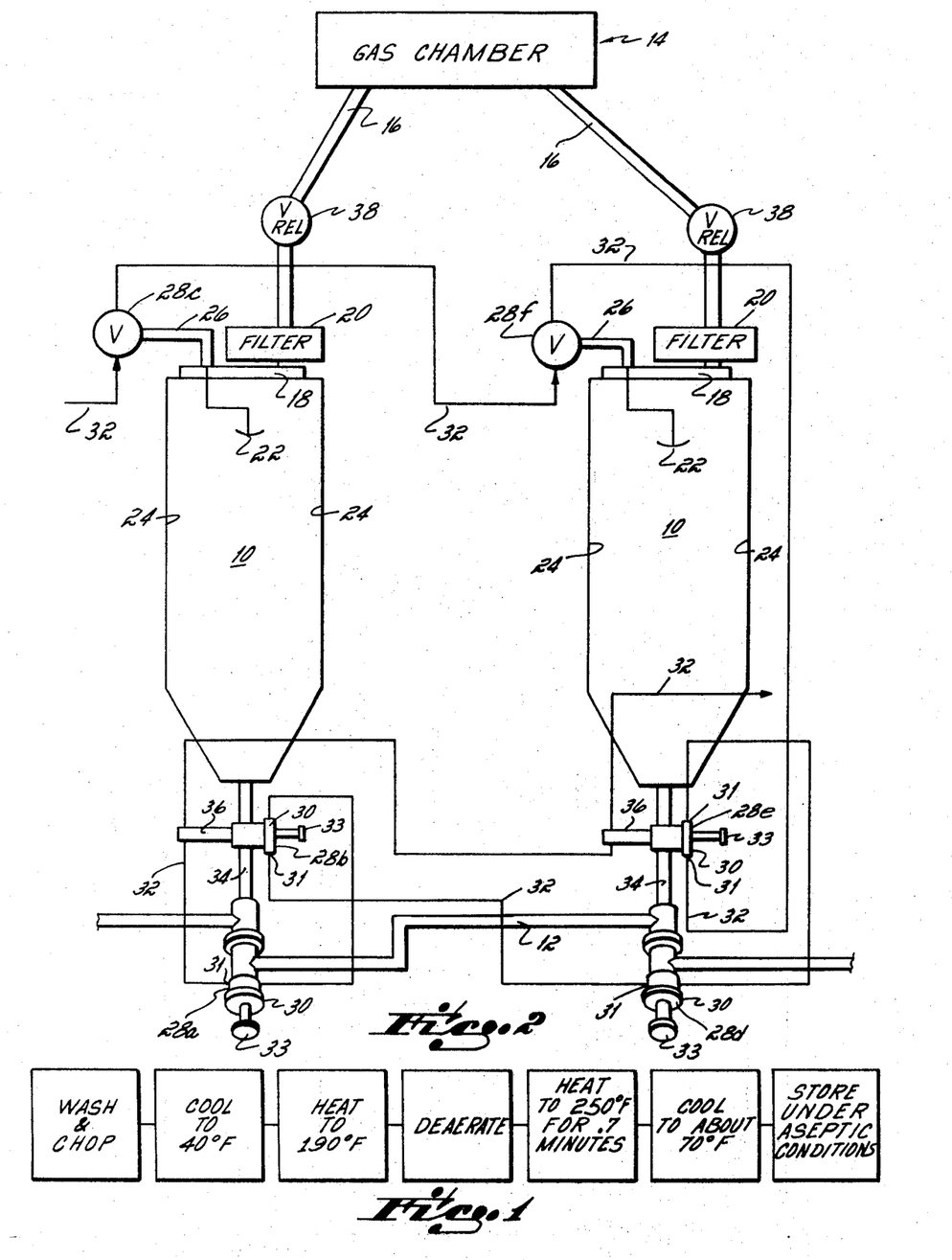
FIG. 1 is a flow chart setting out the various steps of our process.
FIG. 2 is a schematic diagram showing our storage facilities.

Referring now to FIG. 2, we shall now describe how to aseptically store the tomato product after it has been sterilized. In FIG. 2 the numbers 10 designate generally storage tanks for storing the product. They may be of generally conventional design and preferably have vertical side walls and a conical bottom wall. The interior of the tanks is coated with a corrosion-resistant coating such as "Lastiglas" Any number of tanks may be used in combination so as to provide the desired storage capacity. A pipe line 12 connects the tanks to one another and also to the sterilization equipment, i.e., the TRIPLE TUBE heat exchanger. A source of inert gas, designated generally by the number 14, such as nitrogen, is provided. If desired, the inert gas could, of course, be another inert gas such as krypton, argon or helium or mixtures thereof. Conveniently, the nitrogen source can be bottled nitrogen gas. Connecting the nitrogen source 14 to the tanks 10 are nitrogen supply lines 16. The nitrogen line enters the tank 10 through a hermetically sealed manhole cover 18. Between the nitrogen source 14 and the manhole cover 18 is interposed a microbiological filter 20, of conventional design, which serves to insure that the nitrogen passing therethrough is not contaminated. In order to sterilize the interior of the tank a spray head 22 is provided on the interior thereof. It is of conventional design and is designed to spray a sterilizing solution into the interiors of the tanks and onto the interior walls 24 thereof. It is connected to the end of a tube 26 which, in addition to other functions to be described hereinafter, also supplies the spray head 22 with the sterilzing fluid.

The system includes specifically designed aseptic valves 28a–f. These valves are described in detail in Philip E. Nelson copending U.S. patent application Ser. No. 40,550, filed May 26, 1970, entitled "Aseptic Storage And Valving System," incorporated herein by reference. Generally, the valve may be described as follows. The valves include sterilizing chambers 30 which completely surround the movable valve stem actuators, not shown. Each chamber 30, which takes the form of a cavity in the valve body at a point encircling the stem, is provided with an inlet and an outlet port 31, both of which are also formed in the valve body. The inlet and outlet ports 31 permit the chamber 30 to be charged and drained with a liquid chemical sterilizing agent, such as an iodine solution. Sterilizing fluid lines 32 connected to a suitable source of sterilizing fluid, not shown, convey the fluid to the sterilizing chambers 30.

To seal the sterilizing chamber with respect to the bore in which the valve stem is located, O-rings, not shown, are provided on the stem above and below the chamber at points selected, such that in the normal course of travel of the stem in opening and closing the valve, both O-rings remain at all times in the stem bore, neither O-ring at any time entering the chamber. To positively prevent the inner O-ring, i.e., the O-ring closest to the valve plug, from entering the chamber in the course of opening the valve, a shoulder is provided on the stem which abuts the inner end of the stem-receiving bore, positively limiting O-ring travel. The outer valve stem O-ring is also positively prevented from entering the chamber in the course of valve closure, in this instance by engagement of the valve plug with the seat when the valve is closed.

Any number of ports, not shown, for permitting liquids to pass through the valve in the desired direction may be provided. A handle 33 is provided to operate the valve stem and permit the tomato product to be selectively directed through the valve.

Once the aseptic valves 28a–f are sterilized, they will remain that way during subsequent valving operations. Preferably, as disclosed in said application Ser. No. 40,550, sterilizing fluid lines 32 connect the valves 28 in series so that the sterilizing fluid which initially enters the first valve 28a in the series is conveyed through the remaining valves and into a sterilizing fluid monitoring device, not shown. The purpose of this monitoring device is to sample the sterilizing fluid to determine whether it in fact is sterile. By linking the valves in series and flushing them at the same time with the sterilizing fluid, an easy determination can be made as to when all of the valves have been sterilized.

The product conveying line 12 is connected to one of the aseptic valves 28a previously discussed. A tube 34 connects valve 28a with another valve 28b and with the interior of the tank 10. By opening or closing the valve 28a via the handle 33, the tomato product can either be directed through tube 34 to valve 28b or through tube 12 to another aseptic valve 28d used in combination with another tank. Depending on whether the aseptic valve 28b adjacent the bottom of the tank 10 is opened or closed, the tomato product may be conveyed either into the tank or elsewhere through tube 36. Tube 36 provides a convenient sampling port for sampling the product.

It is extremely important for the storage tanks, connecting lines, valves, etc., to be sterilized before the tomato product is pumped thereinto for storing. We have found the following sterilizing procedures to be especially suitable for this purpose. Initially, the manhole cover 18 is removed and the nitrogen line 16 between the filter 20 and the tank 10 is washed with a warm cleaning solution using a flexible brush. This solution can be a solution sold by the Klenzade Company under the trademark "HC-90."

Next, the lid is securely fastened. With the aseptic valve 28c open, a solution of HC-90 at a temperature of about 150° F. is circulated through the spray ball 22 and into the tanks 10 for about 20 minutes. We have found that the concentration of the HC-90 cleaning solution should be about one pound in 6⅔ gallons of water. As this operation is effected, the valve stem of the aseptic valve 28b is positioned so that the HC-90 cleaning solution passes out of the bottom of the tank through tube 36. After the circulation of the solution has been discontinued, tap water is sprayed into the tank through the spray ball 22 and the tank is rinsed until the fluid flowing therefrom is clear. The nitrogen line 16 should also be flushed with a sterilizing fluid. The microbiological filter 20 includes a sterile paper filter not shown. The metal holder for the sterile paper filter can be conveniently sterilized in any suitable manner, such as by means of a sterile solution. Next, a sterilizing solution is circulated through the spray ball for about 40 minutes. This solution should have not less than 20 ppm of iodine acidified to approximately a pH of 3.0. The temperature of the water used for the solution should not be greater than about 110° F. The solution is passed out of the bottom of the tank, through the aseptic valve 28b, and through tube 36. Next, the tank is pressurized with nitrogen from source 16 to force any residual solution out of the bottom of the tank. The valves 28a-c are then closed to await the filling of the tank. Nitrogen gas is maintained in the tank.

Valve 28a, valve 28d, lines 12 and 34 are also sterilized by passing through them a suitable cleaning and sterilizing fluid.

Assuming that a sterilized tomato product has been produced according to the steps previously outlined and that the storage equipment has been cleaned and sterilized, the product may be stored in the following manner. It is pumped by suitable means through the tube 12 to the aseptic valve 28a. This valve is opened so that the product passes into the tube 34. Valve 28b is closed except when periodic samples are being taken so that the product passes into the tank 10. As the tank fills, nitrogen is exhausted either through the tube 26 or through pressure release valves 38. After the tank has been filled to the desired level, valves 28a, b and c are in the closed position. Nitrogen continues to be supplied through line 16 so that a positive pressure of about 5 pounds is maintained in the headspace above the tomato product. To fill the second tank 10, valve 28a is positioned so that the tomato product flows to valve 28d, which is open so that tomato product flows into the tank. After the second tank has been filled, valves 28d -f are in the closed position, and the procedure previously described follows. Any other tanks in the system are filled in a similar manner. During storage, the sterilizing solution can be circulated as desired through the lines 32 so that the sterilizing chambers 30 are continuously maintained under sterilizing conditions.

The product can be stored under ambient temperature conditions for protracted periods, e.g., from several months to a year. When it is desired at some later date to process the tomatoes, the desired amount may be withdrawn from the bottom of the tank for processing.

Figure 3:
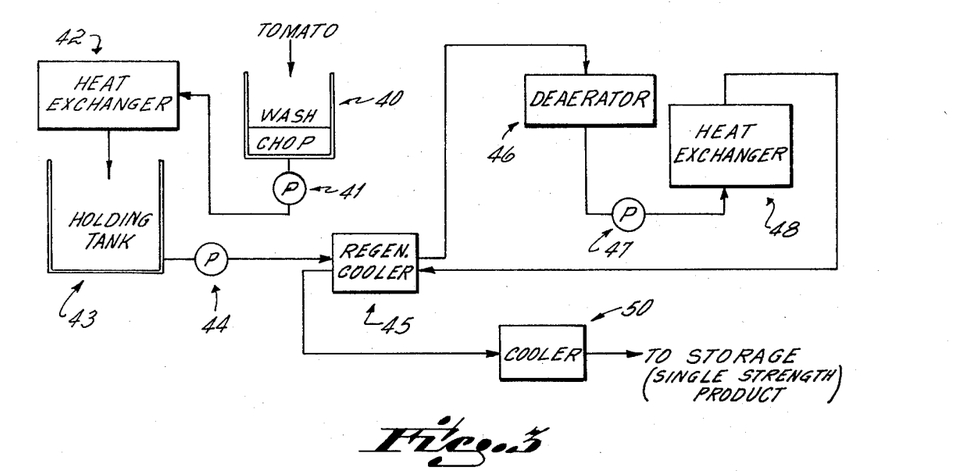
FIG. 3 is a schematic diagram of a system for carrying out the process for storing a single strength product.

The system for carrying out the process for storing a single strength product is shown diagrammatically in FIG. 3. As there shown, the system includes apparatus 40 for washing and chopping tomatoes. Various suitable types of such apparatus are well known in the art. From the chopper the chopper tomato pieces are pumped by a pump 41 to a cooling unit, or heat exchanger, 42. While different types of heat exchangers can be utilized, such as the TRIPLE TUBE described above, one very suitable type of heat exchanger is a scraped surface heat exchanger, such as a "Contherm" heat exchanger produced by Contherm Corporation and sold by the DeLaval Separator Company.

A Contherm heat exchanger comprises an inner and outer cylinder. The product is pumped into the inner cylinder and as it flows through the cylinder is continuously agitated and removed from the walls by rotating blades. A cooling medium travels in the annular space between the inner heat transfer cylinder and the outer wall.

In accordance with the present invention, the product is cooled in heat exchanger 42 to a temperature below 50°F. and preferably to approximately 40° F. The product flows from heat exchanger 42 to holding tank 43 and is retained at the chilled temperature for a period preferably of about 4 minutes. We have determined that holding the product at its chilled temperature for a period of several minutes further enhances the viscosity increase described above.

From the holding tank 43 the product is pumped by a pump 44 to a regenerative heater-cooler 45. This regenerative heater-cooler can be any suitable form of equipment, for example, a double tube heat exchanger. The chilled product enters the regenerative cooler at a low temperature and is subjected to a first heating step effective to raise the temperature of the product of the order of between 190° F. to 200° F. and, in some instances, a high as 220° F. While the length of time the product is held at this temperature is not critical, we have determined that a preferable time is approximately between 1 and 5 minutes.

As is explained below, the heat for raising the temperature of the product in the regenerative cooler is supplied by heat loss in the heated final product which is counterflowed through the heater, the final product entering the heater at approximately 250° F. and emerging at approximately 100° F.

Returning now to the 190° F. product emerging from the regenerative cooler, this product is fed to a deaerator 46. Many different types of deaerators are known to those skilled in the art and it is considered unnecessary to describe this equipment in detail. As was pointed out previously, the single strength product is deaerated in unit 46 and, if desired, hydrochloric or other acid can be added to the product at this point in the process.

Following deaeration, the product is pumped by a pump 47 to another heat exchanger 48. In one preferred system this unit again is constituted by a Contherm heat exchanger. In heat exchanger 48 the product is quickly heated to destroy the microorganism *Bascillus Coagulans*. The equivalent temperatures and holding times for the destruction of this microorganism are set forth above and include, for example, heating the product to 250°F. and holding it at this temperature for 7/10 of a minute. The product, after discharge from the heat exchanger 48, flows to regenerative cooler 45 in which the temperature of the product is cooled to approximately 100°F. Thereafter, the product flows to a second cooler unit 50 effective to lower the temperature of the product to approximately ambient temperature, e.g., 80° F. The cooled single strength tomato product is now fully sterilized and is introduced into the storage tanks, such as tanks 10 described above.

Figure 5:
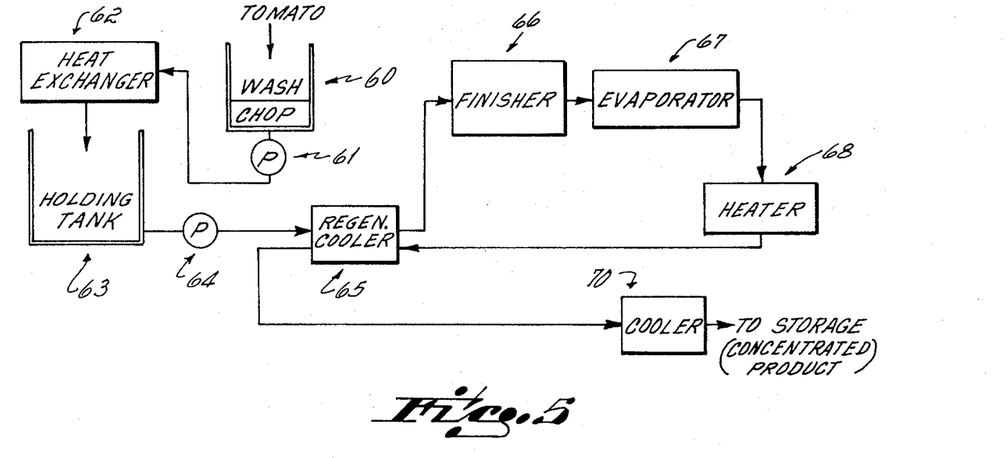
FIG. 5 is a schematic diagram of a modified system for carrying out a modified process for storing a concentrated product.

In some cases it may be desirable to store a concentrated tomato product as opposed to a single strength tomato product. A system for accomplishing this is shown in FIG. 5. As there shown, the system includes apparatus 60 for washing and chopping tomatoes, a pump 61 for pumping the processed product to a heat exchanger 62. Heat exchanger 62 is like heat exchanger 42 and is effective to cool the chopped product to a temperature below 50° F. and preferably approximately 40° F.

The system further includes a holding tank 63 which receives the chilled product and holds it at a temperature of approximately 40° F. for a period of preferably 4 minutes. The chilled product is pumped by a pump 64 to a heating unit 65, of any suitable form, effective to raise the temperature of the product to 190° F. The unit 65 is preferably a regenerative cooler similar to unit 45. In this unit the heat necessary to elevate the temperature of the chilled product is obtained from heat given up by the high temperature end product which is counterflowed through the regenerative cooler.

Thereafter, in the system shown, the heated product is fed to a finishing apparatus 66. This apparatus functions to remove the seeds and skins from the product. Many suitable types of equipment are known to those skilled in the art and it is not considered necessary to describe this unit in detail.

From the finisher the product is fed to an evaporator 67 which is effective to drive off moisture from the product to increase its solids content. For example, to obtain a 16% solids content material, the material is heated to 212° F. at ambient pressure. In order to obtain higher solids content, a vacuum can be applied to the evaporator in a manner well known in the art.

From the evaporator the concentrated product having a solids content between 6 and 32 percent is fed to a second heater 68. This heater is preferably a Contherm heat exchanger like heat exchanger 48. This unit is effective to heat the material to a temperature sufficient to kill the Bacillus Coagulans as explained above. However, since the material in the heater has a somewhat higher solids contents, a different combination of time and temperature is employed. The combinations of times and temperatures effective to kill the *Bacillus Coagulans* for any percentage of solids are well known in the art. For example, if the solids content is 22 percent, heater 68 should be effective to heat the product to a temperature of 220° F. and the material should be retained at this temperature for 7/10 of a minute.

The heated concentrated product flows from the heater unit 68 through regenerative cooler 65 which is effective to reduce the temperature of the material to approximately 100° F. Cooling of the concentrated product is completed in the secondary cooler 70 which reduces the temperature of the product to approximately ambient temperature, at which temperature the concentrated sterilized product is fed to suitable storage tanks, such as tanks 10.

Figure 4:
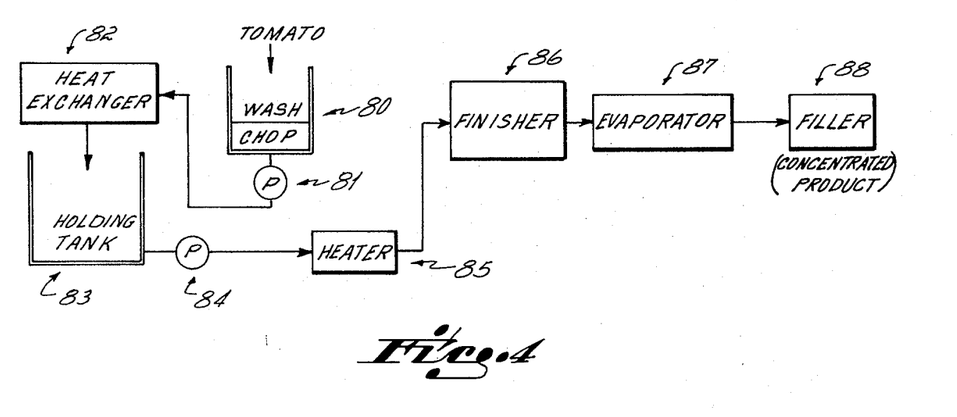
FIG. 4 is a schematic diagram of a modified system for carrying out a modified process in which the tomato product is not stored.

In addition to utilizing the complete process including the storage step, it may also be desirable in some installations to use a modification of our process in which the concentrated finished product is not stored, but rather is bottled or canned immediately. The advantage of utilizing the modified process in this instance is the unexpected viscosity increase described previously. A system for carrying out this modified process is shown in FIG. 4.

As there shown, the tomatoes are washed and chopped in apparatus 80 of any conventional type similar to apparatus 40. The chopped tomatoes are pumped by a pump 81 to an initial heat exchanger 82. This heat exchanger can advantageously be a Contherm unit similar to unit 42 which is effective to chill the product to a temperature below 50° F. and preferably approximately 40° F. The product is fed from the heat exchanger 82 to a holding tank 83 effective to retain the product at its chilled temperature for a suitable period, for example, 4 minutes.

From the holding tank 83 the product is pumped by means of a pump 84 to a heater 85. Heater 85 may be of any suitable construction, such as a double tube heat exchanger or a Contherm unit as described above. Heater 85 is effective to heat the temperature of the product to between 190° to 200° F. Thereafter, the product is fed to a finisher 86, similar to finisher 66, which is effective to remove the seeds and skin from the product. From the finisher the product is fed to an evaporator 87 similar to evaporator 67. The evaporator causes water to be evaporated from the product, raising its solids content to the desired level. Following evaporation, any additional ingredients, such as vinegar and spices utilized to make catsup, are added. The final concentrated product is then fed to a filler 88, of any suitable type, effective to fill the product in bottles, cans or other containers. As indicated above, a tomato product processed in this manner has exhibited an unexpected viscosity increase, such as from 10 to 30 percent less tomatoes are required to make a catsup of a given viscosity as compared to the catsup made from conventionally processed tomatoes.

As will be understood by those skilled in the art, the sequence of the steps of finishing and evaporating can be interchanged, depending upon the consistency of the end product. Thus, for example, it is conventional practice to subject the product to a finishing step before evaporation when the end product is to have a solids content greater than about 15%. On the other hand, it is conventional to reverse the steps and evaporate the product prior to the time it is finished when the end product is to have a solids content less than about 15%.

Those skilled in the art will recognize that the aseptic storage system just described may be used for storing products other than a sterilized single strength or concentrated crushed tomato product. Those skilled in the art will also recognize the applicability of our storage system to single strength, crushed tomato products sterilized in a manner other than the one just described.

Also, those skilled in the art will recognize that the step of initially cooling the tomatoes after crushing to about 40° F. can be employed with a process wherein the product is heated in one step to the sterilization temperature. For instance, advantageous results are obtained if the crushed tomatoes are cooled to 40° F. before they are heated directly to 260° F. in an otherwise conventional process.

Having thus described our invention, we claim:

1. A process for increasing the viscosity of a crushed, tomato product comprising,
   a. washing uncooked tomatoes;
   b. chopping said tomatoes;
   c. cooling said tomatoes to a temperature of below about 50° F.; and maintaining said tomatoes at said temperature below 50° F. before
   d. heating said tomatoes to a temperature of at least about 190° F.

2. A process for increasing the viscosity of a crushed tomato product comprising,
   a. washing uncooked tomatoes;
   b. chopping said tomatoes;
   c. cooling said tomatoes to a temperature of below about 50° F.; and
   d. heating said tomatoes to a temperature of at least about 190° F.; and
   e. subsequently heating said tomatoes to a temperature of at least 245° F. and maintaining said tomatoes at that temperature for a time sufficient to destroy the micro-organism *Bacillus Coagulans*.

3. A process for sterilizing and aseptically storing in bulk a single strength, crushed tomato product comprising the steps of
   a. washing tomatoes;
   b. chopping said tomatoes;
   c. cooling said tomatoes to a temperature of below about 50° F.;
   d. subjecting said tomatoes to a first heating step;
   e. deaerating said tomatoes;
   f. subjecting said tomatoes to a second heating step sufficient to destroy the microorganism Bacillus Coagulans;
   g. cooling said tomatoes; and
   h. aseptically storing in bulk said tomatoes so processed.

4. The process of claim 3 wherein the temperature said tomatoes are cooled to in said step (c) is about 40° F. and the temperature said tomatoes are heated to in said first heating stee (d) is between 190° to 200° F.

5. The process of claim 4 wherein in said second heating step (f) said tomatoes are heated to a temperature of about 250° F. and held at that temperature for about 42 seconds.

6. The process of claim 3 wherein the temperature said tomatoes are heated to in said first heating step (d) is between 190° to 200° F. and wherein said second heating step (f) said tomatoes are heated to a temperature of about 250° F. and held there for about 42 seconds.

7. The process of claim 3 wherein said tomatoes are deaerated in a vacuum of about 3 to 5 inches of mercury.

8. The process of claim 3 wherein said tomatoes are cooled in step (g) to below 100° F.

9. The process of claim 3 wherein a sufficient amount of hydrochloric acid is added in steps (b), (c), (d) or (e) so as to provide a tomato product having a pH of about 2 and wherein said acid is subsequently neutralized.

10. The process of claim 9 wherein said acid is added during said deaerating step (e) and said deaerating is effected in a vacuum of about three to five inches of mercury.

11. The process of claim 6 wherein a sufficient amount of hydrochloric acid is added in steps (b), (c), (d) or (e) so as to provide a tomato product having a pH of about 2 and wherein said acid is subsequently neutralized.

12. The process of claim 6 wherein said acid is added during said deaerating step (e) and said deaerating is effected in a vacuum of about 3 to 5 inches of mercury.

13. The process of claim 3 wherein said tomatoes are aseptically stored in an inert atmosphere.

14. The process of claim 13 wherein said inert atmosphere is nitrogen.

15. The process of claim 3 wherein the heat required for said first heating step is supplied by tomatoes which have previously been subjected to said second heating step.

16. The process of claim 3 wherein said cooling step (g) includes using cooled tomatoes of step (c).

17. The process of claim 3 including the step of maintaining said tomatoes at a temperature of below 50° F. for a period of several minutes before said tomatoes are subjected to said first heating step.

18. The process of claim 3 wherein the temperature said tomatoes are cooled to in step (c) is about 40° F., the process further including the step of holding said tomatoes at said temperature for approximately 4 minutes before said tomatoes are subjected to said first heating step.

19. A process for sterilizing and aseptically storing in bulk a concentrated, crushed tomato product comprising the steps of
   a. washing tomatoes;
   b. chopping said tomatoes;
   c. cooling said tomatoes to a temperature of below about 50° F.;
   d. subjecting said tomatoes to a first heating step;
   e. subjecting said tomatoes to a finishing operation in which the tomato seeds and skin are removed;
   f. evaporating a portion of the liquid from said tomatoes;
   g. subjecting said tomatoes to a second heating step sufficient to destroy the microorganism *Bacillus Coagulans;*
   h. cooling said tomatoes; and
   i. aseptically storing in bulk said tomatoes so processed.

20. The process of claim 19 wherein the temperature said tomatoes are cooled to in said step (c) is about 40° F. and the temperature said tomatoes are heated to in said first heating step (d) is between 190° to 200° F.

21. The process of claim 19 wherein the tomatoes are aseptically stored in an inert atmosphere.

22. The process of claim 19 wherein the heat required for said first heating step is supplied by tomatoes which have previously been subjected to said second heating step.

23. A process for sterilizing and aseptically storing in bulk a tomato product consisting essentially of the steps of washing the tomatoes to be processed,
chopping said tomatoes into pieces, cooling said tomatoes to about 40° to 50°F., effecting an initial heating of said tomatoes to about 190° to 200°F., deaerating said tomatoes, heating sid tomatoes to about 250° F. and holding said tomatoes at said temperature for a time sufficient to destroy the organism *Bacillus Coagulans*, cooling said tomatoes to below about 100°F., and aseptically storing said tomatoes in an inert atmosphere, the initial heating of said tomatoes being effected by causing said tomatoes to pass in heat exchange relationship with other tomatoes which have previously been heated to about 250°F.

24. The process for preparing a tomato product comprising
 a. washing uncooked tomatoes;
 b. chopping said tomatoes;
 c. cooling said tomatoes to a temperature of below about 50° F.; and maintaining said tomatoes at said temperature below 50°F before
 (d) heating said tomatoes to a temperature of at least 190° F;
 e. subjecting said tomatoes to a finishing operation in which the seeds and skin are removed from the product;
 f. evaporating a portion of the liquid from said tomatoes, whereby the solids content of said product is in the range of from 6 to 32 percent;
 g. thereafter introducing said product into a container.

25. The process of claim 24 wherein the temperature said tomatoes are cooled to in step (c) is about 40° F.

26. A system for sterilizing and increasing the viscosity of a tomato product made from tomatoes which have been washed, said system comprising
 means for chopping said tomatoes into pieces,
 first cooling means for cooling said tomatoes to a temperature of below about 50° F.,
 first heating means for heating said tomatoes to between 190° F. and 200° F.,
 first transporting means for transporting said tomatoes from said first cooling means to said first heating means,
 a finisher for finishing said tomatoes,
 an evaporator,
 second transporting means for transporting said tomatoes from said first heating means to said finisher and evaporator,
 means for filling containers with said tomato product,
 and third transporting means for transporting tomatoes from said finisher and evaporator to said filling means.

27. A system for sterilizing and storing in bulk tomatoes which have been washed comprising in combination,
 means for chopping said tomatoes into pieces,
 first cooling means for cooling said tomatoes to a temperature of below about 50° F.,
 first heating means for heating said tomatoes to between 190° F. and 200° F.,
 first transporting means for transporting said tomatoes from said first cooling means to said first heating means,
 means for deaerating said tomatoes,
 second transporting means for transporting said tomatoes from said first heating means to said deaerating means,
 second heating means for heating said tomatoes to a temperature effective to destroy the microorganism *Bacillus Coagulans*,
 third transporting means for transporting said tomatoes from said deaerator to said second heating means,
 second cooling means for cooling said tomatoes to below 100° F.,
 fourth transporting means for transporting said tomatoes from said second heating means to said first heating means and said second cooling means,
 means for aseptically storing said tomatoes in bulk, and
 fifth transporting means for transporting said tomatoes from said second cooling means to said storing means.

28. A system for sterilizing and storing in bulk tomatoes which have been washed comprising in combination,
 means for chopping said tomatoes into pieces,
 first cooling means for cooling said tomatoes to a temperature of below about 50° F.,
 first heating means for heating said tomatoes to between 190° F. and 200° F.,
 first transporting means for transporting said tomatoes from said first cooling means to said first heating means,
 a finisher for finishing said tomatoes,
 an evaporator,
 second transporting means for transporting tomatoes from said first heating means to said finisher and evaporator,
 second heating means for heating said tomatoes to a temperature effective to destroy the microorganism *Bacillus Cagulans*,
 third transporting means for transporting said tomatoes from said finisher and evaporator to said second heating means,
 second cooling means for cooling said tomatoes to below 100° F.,
 fourth transporting means for transporting said tomatoes from said second heating means to said first heating means and said second cooling means,
 means for aseptically storing said tomatoes in bulk, and
 fifth transportion means for transporting said tomatoes from said second cooling means to said storing means.

29. A system for sterilizing and storing in bulk tomatoes which have been washed comprising in combination,
 means for chopping said tomatoes into pieces,
 first cooling means for cooling said tomatoes to a temperature of below about 50° F.,
 counterflow heat exchanger means for heating said tomatoes to between 190° F. and 200° F.,
 first transporting means for transporting said tomatoes from said first cooling means to said counterflow heat exchanger,
 means for deaerating said tomatoes,
 second transporting means for transporting said tomatoes from said counterflow heat exchanger to said deaerating means, heating means for heating said tomatoes to a temperature effective to destroy the microorganism *Bacillus Coagulans*, third transporting means for transporting said tomatoes from said deaerator to said heating means, fourth transporting means for transporting said tomatoes from said heating means to said counterflow heat exchanger, said exchanger being effective to cool said tomatoes, means for aseptically storing said tomatoes in bulk, and fifth transporting means for transporting said cooled tomatoes from said counterflow heat exchanger to said storing means.

30. A system for sterilizing and storing in bulk tomatoes which have been washed comprising in combination, means for chopping said tomatoes into pieces, first cooling means for cooling said tomatoes to a temperature of below about 50° F., counterflow heat exchanger means for heating said tomatoes to between 190° F. and 200° F., first transporting means for transporting said tomatoes from said first cooling means to said counterflow heat exchanger, a finisher for finishing said tomatoes, an evaporator, second transporting means for transporting tomatoes from said counterflow heat exchanger to said finisher and evaporator, heating means for heating said tomatoes to a temperature effective to destroy the microorganism *Bacillus Coagulans*, third transporting means for transporting said tomatoes from said finisher and evaporator to said heating means, fourth transporting means for transporting said tomatoes from said heating means to said counterflow heat exchanger, said exchanger being effective to cool said tomatoes, means for aseptically storing said tomatoes in bulk, and fifth transporting means for transporting said cooled tomatoes from said counterflow heat exchanger to said storing means.

* * * * *